United States Patent [19]

Walton et al.

[11] Patent Number: 4,558,715

[45] Date of Patent: Dec. 17, 1985

[54] APPARATUS FOR INJECTING MEASURED QUANTITIES OF LIQUID INTO A FLUID STREAM

[75] Inventors: Frank A. Walton, Dallas, Tex.; Paul M. Perrinet, Merignac, France

[73] Assignee: Kowatachi International, Ltd., London, England

[21] Appl. No.: 610,755

[22] Filed: May 16, 1984

[51] Int. Cl.⁴ .............................................. G05D 11/03
[52] U.S. Cl. ....................................... 137/99; 91/225; 91/347; 251/75; 251/76; 417/399
[58] Field of Search ................. 137/99; 417/399, 403, 417/511; 91/224, 228, 229, 347; 251/75, 76; 92/13.41, 13.5

[56] References Cited

U.S. PATENT DOCUMENTS

| 1,506,834 | 9/1924 | Hook | 251/75 |
| 1,674,614 | 6/1928 | Berkman | 417/403 |
| 2,262,031 | 11/1941 | Meyer | 137/99 X |
| 2,712,427 | 7/1955 | Welborn et al. | 251/76 X |
| 3,213,873 | 10/1965 | Cordis | 137/99 |
| 3,665,808 | 5/1972 | Vestal | 417/399 X |
| 3,692,274 | 9/1972 | Rosen et al. | 251/75 |
| 3,901,313 | 8/1975 | Donignian et al. | 417/403 X |
| 3,937,241 | 2/1976 | Cloup | 137/99 |

FOREIGN PATENT DOCUMENTS 595458  12/1947  United Kingdom .

Primary Examiner—Alan Cohan
Assistant Examiner—Stephen M. Hepperle
Attorney, Agent, or Firm—Hubbard, Thurman, Turner & Tucker

[57] ABSTRACT

A liquid additive injection pump has a hydraulic motor comprising a differential piston assembly reciprocable in a housing under the urging of a primary liquid into which an additive is to be injected. The piston assembly carries valves which are responsive to movement of the piston assembly to open and close to effect the transfer of a primary fluid charge from the pump motor to a discharge passage and to effect reciprocation of the piston assembly. The motor piston is connected to a central axially disposed longitudinally extending piston rod which extends into an additive injection pump cylinder and engages a floating additive injection pump piston having a stack of additive pump displacement control washers engaged therewith and disposed on the piston rod. A spring biased toggle type linkage snaps the motor valves into open and closed positions to provide positive movement of the valve members. Liquid additive is injected into the primary fluid stream at the outlet passage of the apparatus and downstream of the motor mechanism to prevent exposure of the pump actuating motor to the additive substance.

19 Claims, 11 Drawing Figures

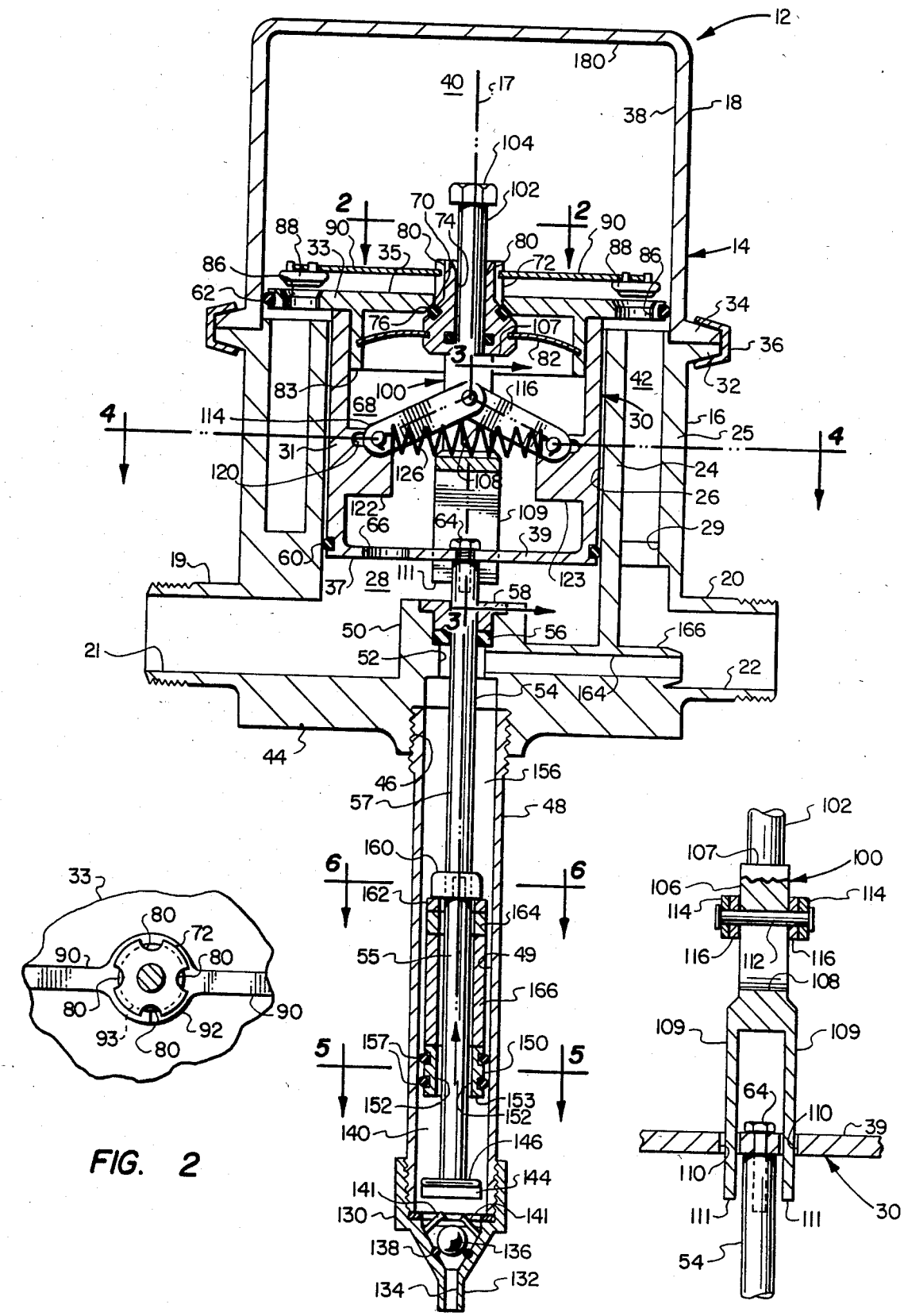

APPARATUS FOR INJECTING MEASURED QUANTITIES OF LIQUID INTO A FLUID STREAM

BACKGROUND OF THE INVENTION

Field of the Invention

The present invention pertains to a pumping apparatus for injecting predetermined quantities of liquid into a fluid stream. The apparatus is adapted to be interposed in a conduit and powered by the fluid flowing through the conduit for injecting an additive into the fluid flowing through the conduit.

BACKGROUND

Several devices have been developed for injecting predetermined quantities of liquid additives into a liquid flow stream for such applications as adding medication to drinking water for livestock, treating water with additives such as chlorine or iodine and adding fertilizer concentrate to irrigation water, for example. An example of a device which is powered by the liquid stream to which the additive is being injected is described in U.S. Pat. Nos. 3,937,241 and 4,060,351 to Philippe Cloup. In the apparatus described in the Cloup patents, the additive or adjuvant is injected into the main fluid stream within the piston chamber of the hydraulic motor which drives the additive injection pump. This is particularly disadvantageous when the additive is a corrosive fluid such as chlorine, fertilizer or other chemically active substance. Accordingly, it is desirable to be able to inject the additive into the liquid stream at a point downstream of the motor which is powering the additive pump to avoid problems associated with the corrosive action of the additive.

Another feature which is desired in the general type of apparatus described herein is the provision of a hydraulic motor and an injection pump mechanism wherein the driving forces act generally along the central axes of the motor piston and pump piston to prevent skewing the respective pistons in their working bores, and to provide valve actuating mechanisms for the hydraulic motor which are operable to positively and reliably effect reciprocation of the motor piston. These desiderata and other features of the present invention will become apparent upon reading the following summary and detailed description.

SUMMARY OF THE INVENTION

The present invention provides an improved liquid additive injection pump apparatus of a type wherein a predetermined quantity of liquid additive may be metered into a primary fluid flow stream and wherein the primary fluid itself provides the motive fluid for actuating the additive injection pump.

In accordance with one aspect of the present invention an additive injection pump is provided wherein a hydraulic motor having a differential piston is connected to a reciprocating piston additive injection pump so that the driving forces of the motor are directed generally along the central axes of the motor piston and the additive pump piston.

In accordance with another aspect of the present invention there is provided an improved additive injection pump wherein the predetermined quantity of additive is injected into the primary fluid stream at a point downstream of the pump actuating motor to avoid injecting corrosive substances into the motor mechanism itself.

In accordance with yet another aspect of the invention there is provided an improved liquid additive injection pump wherein the pump displacement may be easily adjusted to vary the predetermined quantity of additive injected into the primary fluid flow stream.

In accordance with still another aspect of the present invention there is provided a liquid additive injection pump having a unique mechanism for positively opening and closing fluid inlet and discharge valves for the pump hydraulic motor in response to reciprocation of the motor piston.

The present invention provides a fluid additive injection pump for injecting a fluid adjuvant into a primary fluid flow stream which is powered by the fluid flow stream and is mechanically uncomplicated, reliable in operation and economical to manufacture. Those skilled in the art will further appreciate the abovedescribed features and advantages of the present invention as well as additional superior aspects of the invention upon reading the detailed description which follows in conjunction with the drawing.

BRIEF DESCRIPTION OF THE DRAWING

FIG. 1 is a longitudinal central section view of the additive injection pump apparatus of the present invention;

FIG. 2 is a detail section view taken along the line 2—2 of FIG. 1;

FIG. 3 is a detail section view taken along the line 3—3 of FIG. 1;

DESCRIPTION OF THE PREFERRED EMBODIMENT

Figure 4:
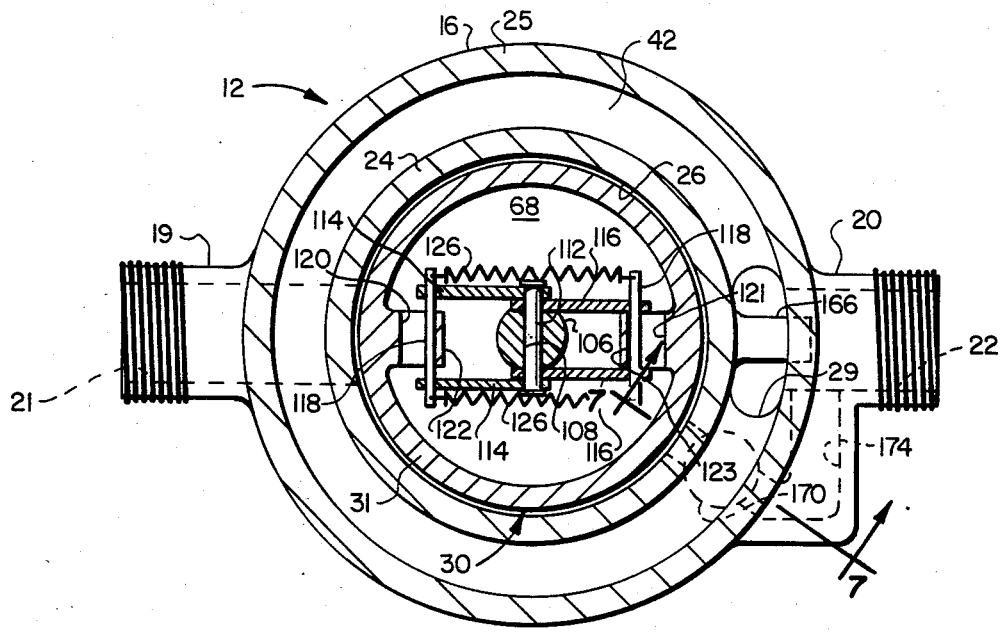
FIG. 4 is a section view taken along the line 4—4 of FIG. 1.

In the description which follows like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Referring to FIG. 1, the improved liquid additive injection pump apparatus is generally designated by the numeral 12 and comprises a housing 14 having a lower section 16 and an upper section 18. The housing section 16 includes opposed bosses 19 and 20 providing respective fluid inlet and discharge passages 21 and 22. The bosses 19 and 20 are adapted to be connected to a conduit, not shown, for conducting a primary liquid flow stream, such as water, into which a fluid additive is to be injected to flow with the liquid leaving the passage 22 and being conducted to an end use.

The housing 16 includes an interior cylindrical wall part 24 delimited by a cylindrical bore 26 forming a first expansible chamber 28 for a reciprocable piston assembly 30. The housing 18 is releasably clamped to the housing 16 across cooperating circumferential flanges 32 and 34, respectively, which are suitably secured together with a conventional cylindrical band clamp 36. The housing 18 includes a cylindrical bore 38 which is cooperable with the piston assembly 30 to form a second expansible chamber 40. The housing section 16 further includes a third expansible fluid discharge chamber 42 which is defined in part between the wall part 24 and an outer cylindrical sidewall 25. The chamber 42 is in communication with the fluid discharge passage 22 and the chamber 28 is in communication with the fluid inlet passage 21. The housing section 16 further includes a bottom wall portion 44 integrally formed with the sidewall 25 and having a threaded bore 46 coaxial with the bore 26 for threaded engagement with one end of an elongated tubular additive injection pump cylinder 48. The housing part 16 still further includes an interior cylindrical boss 50 having a stepped bore 52 formed therein and through which a pump piston rod 54 projects and is in slidable sealing engagement with a conventional piston rod seal 56. The rod seal 56 is suitably retained in the bore 52 by a removable plug member 58.

The piston assembly 30 includes a first piston part 31 which is reciprocably disposed in the bore 26 and is in sealing engagement therewith a suitable piston ring seal 60. The piston assembly 30 includes a second piston part 33 of larger diameter than the piston part 31 and suitably secured thereto and slidably disposed in the chamber 40. The piston part 33 is in slidable sealing engagement with the bore 38 by a suitable piston ring seal 62. Accordingly, the axially projected area of piston face 35 with respect to a longitudinal central axis 17 and exposed to the chamber 40 is greater than the opposed axially projected area of piston face 37 which is exposed to chamber 28. The differential areas between the effective piston faces 35 and 37 are important to the functioning of the motor utilizing the piston assembly 30. A bottom wall 39 of the piston part 31 is suitably secured to the upper end of piston rod 54 by a threaded fastener 64. The bottom wall 39 includes an opening 66 therein which communicates the chamber 28 with an interior chamber portion 68 of the first chamber 28 formed within the piston assembly 30. The piston part 33 includes a central bore 70 which is cooperable with a movable valve closure member 72 to place the chambers 28 and 40 in communication with each other and to effectively block the flow of fluid between the chambers 28 and 40.

Referring to FIGS. 1 and 2, the closure member 72 comprises a generally cylindrical plug having a central longitudinal bore 74 formed therein and having a resilient seating member 76 engageable with the piston part 33 to block communication between the chambers 28 and 40 through the bore 70. However, the closure member 72 is movable in a generally downward direction, viewing FIG. 1, to place the chambers 28 and 40 in communication with each other through plural longitudinal grooves 80, see FIG. 2 also, formed in a reduced diameter portion of the closure member. The closure member 72 is adapted to be biased in the position shown or in an open position to be shown and described further herein in conjunction with FIGS. 9 and 10 by a leaf spring 82 which is secured to the closure member 72 and is engaged with an axially projecting flange portion 83 of the piston part 33.

Figure 9:
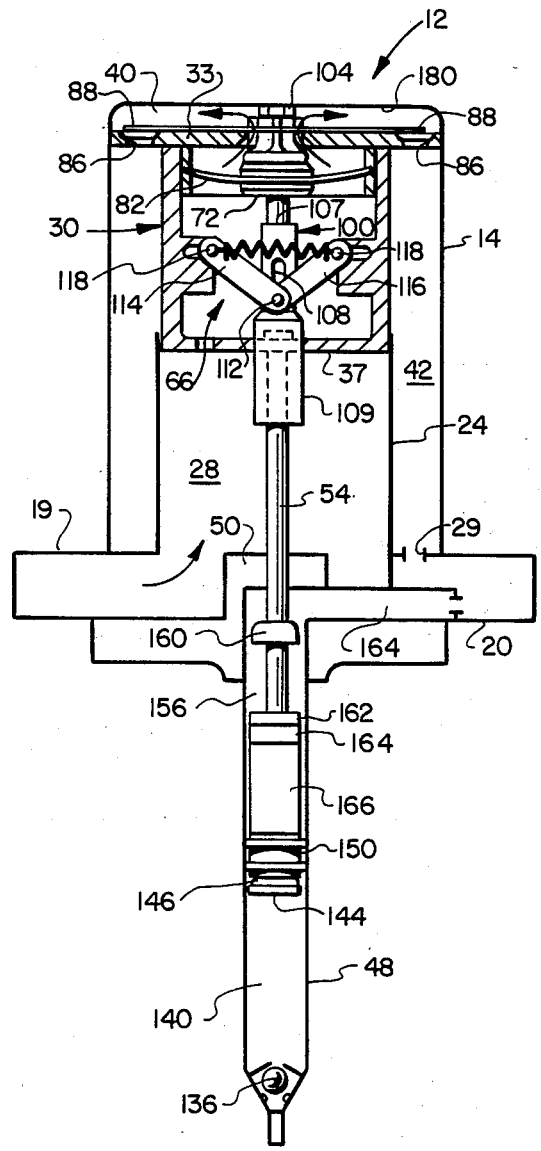
Figure 10:
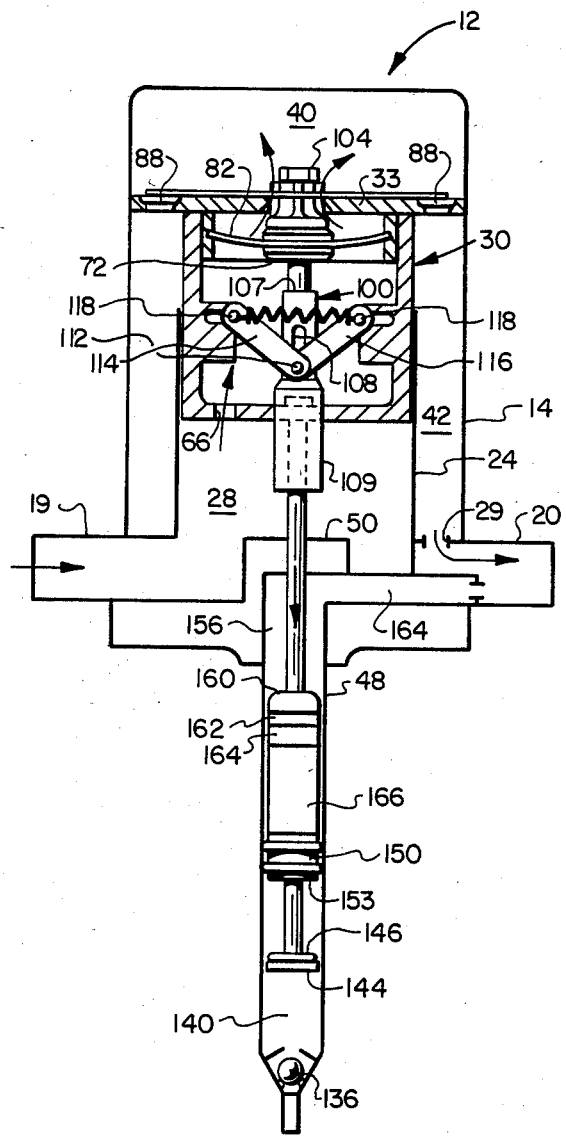

The piston part 33 further includes at least two fluid discharge valve passages 86 formed near the outer periphery of the part 33 and in communication with the chamber 42. Poppet type valve closure members 88 are disposed for closing the passages 86 and are supported on opposed radially projecting arms 90 of a support member 92 which is suitably secured on the closure member 72 in a peripheral groove 93, FIG. 2. Accordingly, when the closure member 72 moves to a position such as shown in FIGS. 9 and 10 to place the chambers 28 and 40 in communication with each other the valve closure members 88 move to block flow of fluid between the chambers 40 and 42. The support arms 90 are somewhat resiliently deflectable to provide for suitable seating of the closure members 88 against the piston part 33 to close the passages 86.

Referring now to FIGS. 1, 3 and 4, the valve members 72 and 88 are assisted in their movement between respective open and closed positions by a mechanism comprising an elongated cylindrical shaft 100 having a portion 102 slidably disposed in the bore 78 and having a transverse collar portion 104 formed on its upper distal end, FIG. 1. The shaft 100 includes an enlarged diameter portion 106 forming a transverse shoulder 107 with the portion 102 and having an elongated slot 108 formed therein. The lower end of the shaft 100 includes a yoke section forming opposed axially extending arms 109 which project through slots 110 formed in the piston bottom wall 39 on opposite sides of the upper end of piston rod 54.

Figure 11:
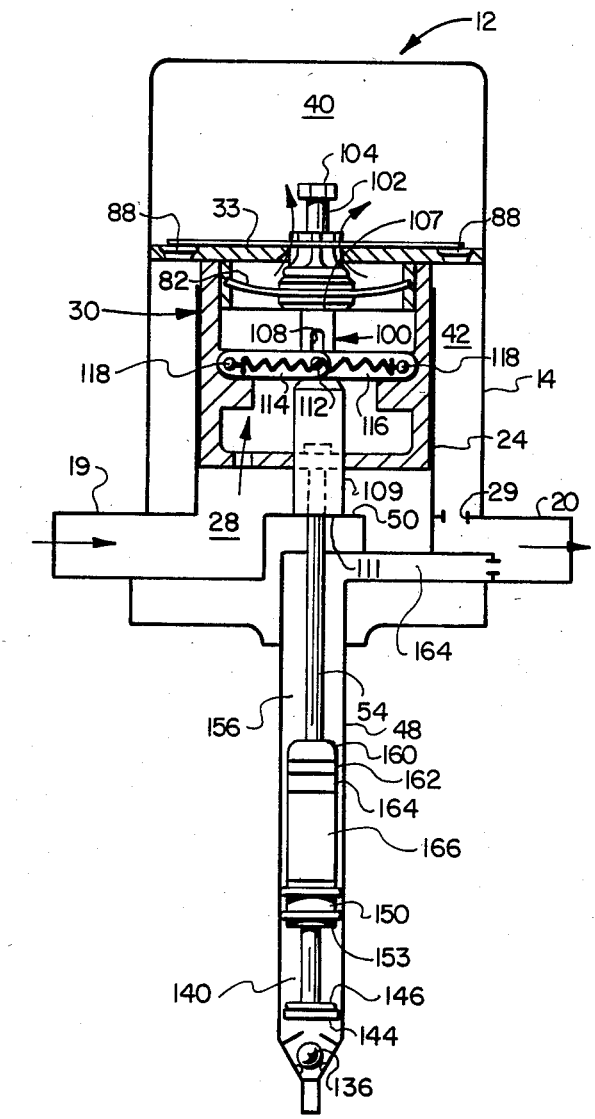

The shaft 100 is biased in opposed limit positions by a toggle type biasing mechanism including a lost motion coupling formed by a pin 112, FIGS. 3 and 4, disposed in the slot 108 and secured at its opposite ends to opposed links 114 and 116, respectively. The links 114 and 116 are suitably retained on the pin 112 and are pivotal relative to the pin. The opposite ends of the links 114 are connected to a pin 118 disposed in an elongated slot 120 formed in a boss 122 on the piston part 31. In like manner, the links 116 are suitably secured to a second pin 118 disposed in an elongated slot 121 formed in a boss 123 virtually identical to the boss 120 and directly opposite the boss 120 as shown in FIG. 4. The pins 118 are secured to a pair of extension coil springs 126 which yieldably bias the pins toward each other to the limit position shown in FIG. 4 in the slots 120 and 121. However, in response to movement of the piston assembly 30 in an upward direction, viewing FIG. 1, the links 114 and 116 are operable to extend the pins 118 in the slots 120 and 121 through the centered position of the links shown in FIG. 8 to the position shown in FIG. 9 to snap the closure member 72 into an open position and the closure members 88 into a closed position. In response to downward movement of the piston assembly 30 the distal ends 111 of the arms 109 are engageable with the boss 50, as shown in FIG. 11, to move the links 114 and 116 through a centered position to snap the closure member 72 in a closed position and the closure members 88 into an open position, as illustrated in FIG. 1. The operation of the valve biasing mechanism will be further described in conjunction with the operation of the apparatus 12 hereinbelow.

Referring again to FIG. 1, the liquid injection pump cylinder 48 is closed at its lower end by a removable cap 130 which includes a fitting 132 forming a liquid additive inlet passage 134. The cap 130 is threadedly connected to the lower end of the cylinder 48 and also is provided with a ball type check valve 136 which is operable to engage a seat 138 to prevent flow of fluid out of an interior chamber 140 through the passage 134. The check valve 136 is suitably retained for limited movement away from seat 138 by opposed retainer fingers 141. The piston rod 54 extends substantially through the chamber 140 in the position of the piston assembly 30 illustrated in FIG. 1 and includes a lower transverse flange 144 supporting a circumferential seal member 146 which may be a conventional o-ring or the like.

Figure 5:
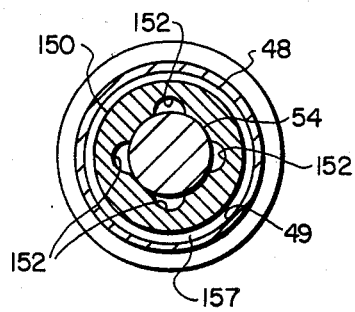
FIG. 5 is a section view taken along the line 5—5 of FIG. 1.

Referring to FIGS. 1 and 5, in particular, the pump cylinder 48 includes a longitudinal bore 49 defining, in part, the chamber 140 and slidably supporting therein an additive injection pump piston 150. The piston 150 is slidably journalled on the rod 54 and includes a plurality of longitudinal passages 152 formed therein and communicating the chamber 140 with a chamber portion 156 formed in the cylinder 48 between the piston 150 and the seal 56. A lower transverse end face 153 of piston 150 is engageable with the seal ring 146, however, to close off communication of fluid between the chambers 140 and 156 through the passages 152. The piston 150 is supported in the bore 149 by suitable piston ring seals 157 disposed in cooperating circumferential grooves formed in the piston 150 in a conventional manner.

Figure 6:
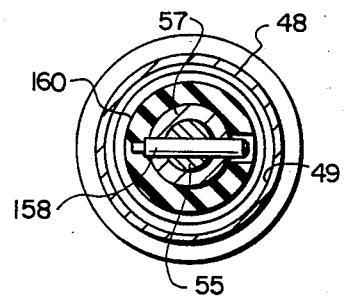
FIG. 6 is a section view taken along the line 6—6 of FIG. 1.

Referring to FIGS. 1 and 6, in particular, the lower end of the piston rod 54 includes a separable rod section 55 which is secured to an upper rod section 57 by a transversely extending retaining pin 158, FIG. 6, which extends through cooperating transverse bores formed in the rod sections 55 and 57, respectively, to join the rod sections together. The pin 158 may be suitably retained in the position shown in FIG. 6 by a resilient retaining collar 160 which is removable to permit extraction of the pin 158 whereby the rod section 55 may be separated from the rod section 57. The collar 160 also forms a retainer for a plurality of circumferential additive pump displacement control washers 162, 164, and 166, as shown by way of example in FIG. 1 retained on the rod 54 between the collar 160 and the piston 150. The washers 162, 164 and 166 are preselected in accordance with the predetermined quantity of liquid to be injected per stroke of the additive injection apparatus and placed over the rod section 55 for retention between the piston 150 and the collar 160. The washers 162, 164 and 166 are of smaller diameter than the bore 49 and are loosely retained on the piston rod 54 to permit free flow of additive fluid therearound.

In accordance with an important aspect of the present invention a fluid additive substance may be injected into the primary fluid flowing through the apparatus 12 by injection of the additive fluid into the passage 22 downstream of the motor formed, in part, by the piston assembly 30 so that the additive will not be exposed to the piston assembly, its seals, the valves 72 and 88 or the valve actuating mechanism described hereinabove. In this regard, the housing section 16 is provided with a passage 164 formed by a conduit 166 extending from communication with the chamber 156 into the passage 22 whereby displacement of fluid from the chamber 156 by the piston 150 results in injection of fluid into the passage 22 to mix with the primary fluid after it has passed substantially through the apparatus 12. Accordingly, corrosive fluids used as additives for the primary fluid flowing through the passages 21, chambers 28, 68, 40 and 42 and passage 22 is mixed with the primary fluid only after it has completed its work in actuating the piston assembly 30. In this way the additive is not exposed to the working parts of the motor for actuating the piston rod 54 and the pump piston 150.

Figure 7:
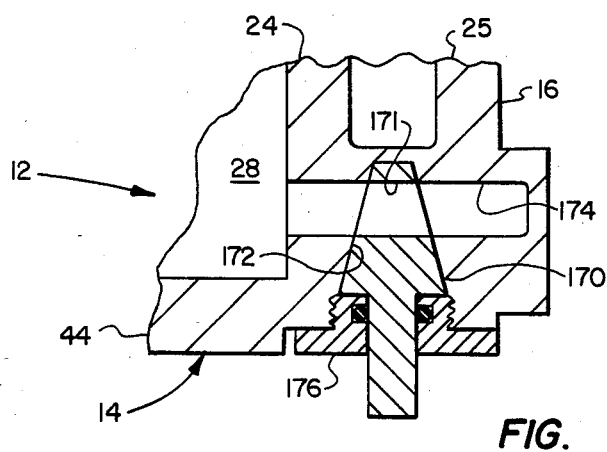
FIG. 7 is a detail section view taken along the line 7—7 of FIG. 4.

Referring briefly to FIGS. 4 and 7, the apparatus 12 also includes a bypass valve for bypassing the primary fluid which would normally flow through the apparatus 12 directly from the chamber 28 to the passage 22 without actuating the motor piston assembly 30. A conventional tapered plug valve closure member 170 is suitably supported in a tapered valve bore 172 formed in the housing 16 and interposed in a passage 174 which extends between the chamber 28 and the passage 22 as indicated in FIGS. 4 and 7. The closure plug 170 is suitably retained in the bore 172 by a removable retaining nut 176. In response to rotation of the closure plug 170 to the position shown in FIG. 7 primary fluid may flow directly from chamber 28 through passage 174 and a suitable passage 171 formed in the closure plug directly to the passage 22. The plug 170 may be rotated approximately 90° from the position shown in FIG. 7 to block the flow of fluid from chamber 28 directly to passage 22 by way of passage 174.

Figure 8:
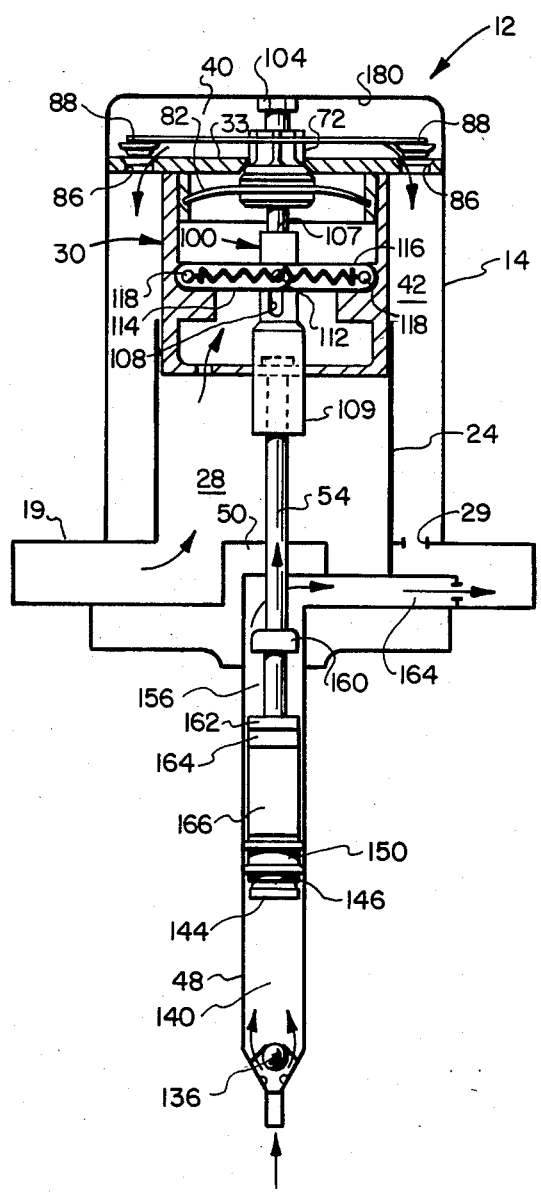
FIGS. 8 through 11 are views of the apparatus in schematic form showing the positions of the respective parts of the apparatus as the motor and injection pump pistons move through an operating cycle.

The operation of the apparatus 12 will now be described primarily in conjunction with drawings FIGS. 1 and 8 through 11. Referring to FIGS. 1 and 8, in particular, in the position of the piston assembly 30 and the piston 150 illustrated in FIG. 1, it will be assumed that primary fluid under pressure is present in chambers 28 and 68 from a source, not shown, by way of passage 21 and that the bypass valve closure member is closed to block the passage 174. It will further be assumed that primary fluid at a reduced pressure is present in chambers 40, 42 and passage 22 and, since the valves 88 are in an open position the pressure is the same in these respective chambers. It will also be assumed that the passage 134 is in communication with a source of fluid additive, not shown, and that a quantity of additive has been drawn into chamber 140 as the result of a previous operating cycle of the piston 150 and the piston rod 54. Due to the higher pressure of fluid in the chambers 28 and 68 than the fluid pressure in chambers 40 and 42 the piston assembly 30 is being urged to move upwardly due to a pressure fluid force acting across the effective area defined by the piston face 37.

As the piston assembly 30 moves from the position shown in FIG. 1 to the position shown in FIG. 8, the flange 144 moves upward to sealingly engage the piston 150 with the seal 146. As soon as the seal 146 engages the piston 150 additive fluid trapped in chamber 156 is forced through passage 164 into passage 22 during further upward movement of the piston 150. At the same time check valve 136 opens to admit a fresh charge of additive fluid to the chamber 140 below the piston 150 as indicated by the position of valve 136 in FIG. 8. When the piston assembly 30 moves to the position shown in FIG. 8, the collar 104 has become engaged with the transverse housing wall 180 to arrest further movement of the shaft 100 and to displace the pins 118 in their respective slots 120 and 121 to the centered position illustrated in FIG. 8 of the respective links 114 and 116. In the position shown in FIG. 8, the valve closure member 72 is still in a position to block flow of fluid from chambers 28 and 68 to chamber 40 although fluid in chamber 40 flows through passages 86 into chamber 42. Since the volume of the chamber 42 does not increase at the same rate as decrease in the volume of chamber 40 some displacement of primary fluid occurs from chamber 42 through passage 29 and passage 22 to mix with the additive being injected into passage 22 during the upward stroke movement of the piston assembly 30 and the piston 150.

Referring now primarily to FIGS. 8 and 9, as the piston assembly 30 moves further upward from the FIG. 8 position, the links 116 and 118 move over center and the springs 126 urge the pins 118 toward each other to cause the pin 112 to translate rapidly to the bottom end of slot 108 impacting the shaft 100 and snapping the valve closure member 72 into the open position shown in FIG. 9 also causing the biasing spring 82 to pass through an overcenter position and assist in urging the closure member 72 open against the urging of pressure fluid acting thereon in chamber 68. Movement of the closure member 72 from the FIG. 8 position to the FIG. 9 position also effectively closes the passages 86 by the seating of the valves 88 against the piston part 33.

With the valve member 72 in the position shown in FIG. 9 pressure fluid at the higher pressure in chambers 28 and 68 is communicated through the passages 80 to the chamber 40 to act on the piston face 35. Since the axial projected face area of the piston face 35 is greater than the opposing effective face area 37, the piston assembly 30 is now urged to move downwardly, viewing FIG. 9, as fluid flows into the chamber 40. Movement of the piston assembly 30 in the downward direction displaces fluid from the chamber 42 through the passage 22 to further mix with the charge of liquid additive which was injected into the passage during the upstroke of the piston assembly.

As the piston assembly 30 moves from the FIG. 9 position to the FIG. 10 position, the valve closure member 72 remains in the open position and the valve actuating mechanism comprising links 114 and 116 and pin 112 remains in the position into which it was displaced during movement to the FIG. 9 position from the FIG. 8 position. However, the piston 150 and the washers 162, 164 and 166 remain in the FIG. 9 position even though the piston rod 54 is moving downward, thanks to frictional engagement of the piston ring seals 157 with the bore wall 149. The piston 150 and the washers supported thereon remain in the FIG. 9 position until the collar 160 engages the assembly of the washers 162, 164 and 166 and the piston 150 whereupon further downward movement of the rod 54 will displace the assembly with the rod 54. During downward movement of the piston rod 54 the check valve 136 is normally in a closed position.

As the piston assembly 30 and the rod 54 move from the FIG. 10 position to the FIG. 11 position fluid in the chamber 140 flows around the flange 144 and through the passages 152 in the piston 150 to maintain the chamber 156 full of liquid additive. When the piston assembly 30 moves from the FIG. 10 position to the FIG. 11 position, the distal ends 111 of the shaft arms 109 become engaged with the top of the boss 50 to move the shaft 100 upward relative to the piston assembly 30 until the links 114 and 116 move to and through the center position shown in FIG. 11 whereupon the springs 126 snap the pin 112 to the upper end of slot 108 impacting the shaft 100 and moving it upwardly engaging the shoulder 107 with the valve closure member 72 and forcibly displacing the valve closure member back to the position illustrated in FIG. 1. Again, due to the spring 82, the closure member 72 is assisted in its movement and biased into the closed position. Of course, movement of the closure member 72 to close off the passage 70 results in opening of the valves 88 to permit flow of fluid from chamber 40 to chamber 42. As soon as the valve closure member 72 closes and the valve closure members 88 open, the piston assembly 30 commences an upstroke described previously; however, displacement of a predetermined quantity of additive does not occur until the seal 146 engages the bottom face 153 of piston 150 to close off communication between chambers 140 and 156.

The abovedescribed operating cycle of the apparatus 12 occurs with relatively great speed depending on the working pressure of the primary fluid flowing into the chamber 28 and the downstream pressure of the fluid in passage 22. However, for the displacement of a predetermined quantity of primary fluid as determined by one stroke cycle of the piston assembly 30 a corresponding predetermined quantity of fluid additive is injected from the chamber 156 into the passage 22. The amount of fluid additive injected per stroke cycle of the piston assembly 30 is preselected by the overall height of the washer stack comprising the washers 162, 164 and 166. Those skilled in the art will appreciate that additional washers may be interposed between the piston 150 and the collar 160 or, one or more of the washers shown by way of example may be removed from the piston rod 54. The fewer number of washers or the smaller the thickness of the washer stack between the piston 150 and the collar 160 the smaller will be the quantity of liquid injected during a stroke cycle of the piston 150 since, upward displacement of the piston 150 by the rod 54 does not occur until the seal 146 engages the face 153. Of course, some relative displacement between the rod 54 and the piston 150 must be maintained to permit transfer of additive fluid from the chamber 140 to the chamber 156 through the passages 152. The number of washers retained on the piston rod 54 may be conveniently changed by unthreading the cylinder 48 at its connection with the housing 16, removing the collar 160 and the pin 158 to separate the rod section 55 from the rod section 57 whereby washers may be added to or removed from the rod section 55 at will. The rod section 55 is then reassembled with the rod section 57 and the cylinder 48 replaced. Of course, the primary fluid flow to the apparatus 12 is preferably shut off during the modification of the displacement of the liquid additive injection apparatus.

Those skilled in the art will appreciate from the foregoing description that the arrangement of the piston assembly 30, piston rod 54 and liquid additive pump piston 150 is such that all working forces acting on these parts of the apparatus 12 are directed generally along the center line or central axis 17 and there is no tendency to cock or skew the piston assembly 30, the rod 54 or the piston 150. This reduces wear and degradation of the seals 56, 60, 62 and 157 and provides for proper seating of the closure members 72 and 88. Still further, those skilled in the art will appreciate that the mechanism for snapping the valve closure member 72 into the open and closed positions provides for positive and reliable operation of the injection pump motor and the pump piston. The apparatus 12 may be constructed of conventional engineering materials for liquid pumps which are compatible with substances being conveyed therethrough. The housing section 16 may be cast of metal or plastic and in like manner the piston assembly 30 may be suitably formed of conventional engineering materials. The seals used throughout the apparatus 12 may comprise conventional o-rings or piston ring type seals, or resilient lip type seals may be used for the seals 56, 60 and 62, for example.

Although a preferred embodiment of the invention has been described herein in detail those skilled in the art will recognize that various substitutions and modifications may be made without departing from the scope and spirit of the invention as recited in the appended claims.

What we claim is:

1. Apparatus for injecting a predetermined quantity of fluid additive into a primary fluid stream comprising:
   a housing defining first and second cylinder bores of different diameters, a differential piston assembly reciprocably disposed in said bores and forming first, second and third fluid chambers in said housing;
   an inlet passage in said housing for conducting primary fluid under pressure to said first chamber to act on said piston assembly;
   a discharge passage in said housing for conducting primary fluid from said second and third chambers from said apparatus;
   additive fluid cylinder means and additive fluid piston means reciprocably disposed in said additive fluid cylinder means for displacing a quantity of additive fluid from said additive fluid cylinder means for injection into said primary fluid;
   piston rod means interconnecting said piston assembly with said additive fluid piston means for reciprocation with said piston assembly;
   first and second valves associated with said piston assembly and movable to respective positions to place said first and second chambers in communication with each other and close off communication between said second and third chambers and alternately close off said first chamber from said second chamber while communiating said second chamber with said third chamber;
   a shaft disposed on said piston assembly for moving said valves between said positions;
   first toggle means for urging said shaft into respective ones of said positions in response to movement of said shaft for biasing said valves in said positions, respectively; and
   second toggle means connected to said first valve for urging said first valve in open and closed positions, respectively;
   said piston assembly, said additive fluid piston means and said shaft being arranged generally coaxial with a central axis of said piston rod means for causing forces acting on said piston assembly to reciprocate said additive fluid piston means to be directed substantially along said axis, and said shaft including means coaxial with a central axis of said piston rod means at opposite ends of said shaft engageable with said housing to initiate movement of said shaft in opposite directions in response to movement of said shaft with said piston assembly toward opposed limit positions of said piston assembly.

2. The apparatus set forth in claim 1 wherein:
said first valve means comprises a first closure member slidably mounted on said shaft and movable between open and closed positions relative to said piston assembly to provide for conducting primary fluid from said first chamber to said second chamber.

3. The apparatus set forth in claim 2 wherein said second toggle means comprises:
leaf spring means interconnected between said first closure member and said piston assembly and operable to bias said first closure member in said open and closed positions, respectively.

4. The apparatus set forth in claim 1 wherein:
said shaft includes a bifurcated extension part forming opposed coextensive arms disposed on opposite sides of said piston rod means and having distal ends engageable with means on said housing to limit movement of said shaft in one direction of movement of said piston assembly.

5. The apparatus set forth in claim 1 wherein:
said additive fluid piston means divides said additive fluid cylinder means into first and second additive fluid chambers, said additive fluid piston means is slidably mounted on said piston rod means and includes passage means interconnecting said additive fluid chambers in at least one position of said additive fluid piston means, and said piston rod means includes spaced apart stop means formed thereon for reciprocating said additive fluid piston means through an additive fluid intake and delivery stroke to effect displacement of a predetermined charge of additive fluid into said primary fluid during a reciprocating stroke cycle of said piston assembly.

6. The apparatus set forth in claim 5 including:
means forming an additive fluid injection passage in said housing and in communication with said additive fluid cylinder means and said discharge passage for injecting additive fluid into said primary fluid downstream of said first chamber in the direction of flow of primary fluid through said apparatus.

7. The apparatus set forth in claim 5 wherein:
one of said stop means on said piston rod means includes means for engagement with said additive fluid piston means to close said passage means in said additive fluid piston means from interconnecting said additive fluid chambers.

8. The apparatus set forth in claim 5 wherein:
said additive fluid piston means includes seal means mounted thereon and engageable with the bore wall of said additive fluid cylinder means to prevent displacement of said additive fluid piston means in said additive fluid cylinder means except when said additive fluid piston means is engaged by one of said stop means.

9. The apparatus set forth in claim 1 including:
bypass passage means in said housing and bypass valve means interposed in said bypass passage means for selectively bypassing primary fluid direction from said inlet passage to said discharge passage.

10. Apparatus for injecting a predetermined quantity of fluid additive into a primary fluid stream comprising:
a housing defining first and second cylinder bores of different diameters, a differential piston assembly reciprocably disposed in said bores and forming first, second and third fluid chambers in said housing;
an inlet passage in said housing for conducting primary fluid under pressure to said first chamber to act on said piston assembly;

a discharge passage in said housing for conducting primary fluid from said second and third chambers from said apparatus;

additive fluid cylinder means and additive fluid piston means reciprocably disposed in said additive fluid cylinder means for displacing a quantity of additive fluid from said additive fluid cylinder means for injection into said primary fluid;

piston rod means interconnecting said piston assembly with said additive fluid piston means for reciprocation with said piston assembly;

first and second valves associated with said piston assembly and movable to respective positions to place said first and second chambers in communication with each other and close off communication between said second and third chambers and alternately close off said first chamber from said second chamber while communicating said second chamber with said third chamber;

means for moving said valves between said positions and biasing said valves in said positions, respectively, including a shaft disposed on said piston assembly for reciprocation relative to said piston assembly to move said valves between said positions, and toggle means including link means interconnecting said shaft with said piston assembly and spring means associated with said link means for biasing said shaft in a selected one of opposite directions in response to said link means moving through an unstable positions between opposed stable positions of said link means corresponding to said positions of said valve means, respectively, said shaft including means engageble with said housing to initiate movement of said shaft in opposite directions in response to movement of said shaft with said piston assembly toward opposed limit positions of said piston assembly, said first valve means comprising a first closure member slidably mounted on said shaft and movable between open and closed positions relative to said piston assembly to provide for conducting primary fluid from said first chamber to said second chamber.

11. The apparatus set forth in claim 10 wherein:
said toggle means includes means forming a lost motion coupling between said shaft and said link means for imparting an impact force to said shaft when said link means moves toward a stable position to move said first closure member toward one of said open and closed positions, respectively.

12. Apparatus for injecting a predetermined quantity of fluid additive into a primary fluid stream comprising:
a housing defining first and second cylinder bores of different diameters, a differential piston assembly reciprocably disposed in said bores and forming first, second and third fluid chambers in said housing and piston rod means connected to said piston assembly;

an inlet passage in said housing for conducting primary fluid under pressure to said first chamber to act on said piston assembly;

a discharge passage in said housing for conducting primary fluid from said second and third chambers from said apparatus;

additive fluid cylinder means and additive fluid piston means reciprocably disposed in said additive fluid cylinder means and dividing said additive fluid cylinder means into first and second additive fluid chambers, said additive fluid piston means being slidably mounted on said piston rod means and including passage means interconnecting said additive fluid chambers in at least one position of said additive fluid piston means, spaced apart stop means on said piston rod means for reciprocating said additive fluid piston means through an additive fluid intake and delivery stroke to effect displacement of a predetermined charge of additive fluid into said primary fluid during a reciprocating stroke cycle of said piston assembly, one of said stop means including means for engagement with said additive fluid piston means to close said passage means in said additive fluid piston means from interconnecting said additive fluid chambers, and spacer means removably mountable on said piston rod means between said additive fluid piston means and one of said stop means for selectively varying the displacement of said additive fluid piston means to vary the charge of additive fluid injected into said primary fluid during a delivery stroke of said additive fluid piston means;

first and second valves associated with said piston assembly and movable to respective positions to place said first and second chambers in communication with each other and close off communication between said second and third chambers and alternately close off said first chamber from said second chamber while communicating said second chamber with said third chamber; and means for moving said valves between said positions and biasing said valves in said positions, respectively, said piston assembly, said additive piston means and said means for moving said valves being arranged generally along a central axis of said piston rod means for causing forces acting on said piston assembly to reciprocate said additive fluid piston means to be directed substantially along said axis.

13. Apparatus for injecting a predetermined quantity of fluid additive into a primary fluid stream comprising:
a housing defining first and second cylinder bores, a differential piston assembly reciprocably disposed in said bores and forming first, second and third fluid chambers in said housing and piston rod means connected to said piston assembly;

an inlet passage in said housing for conducting primary fluid under pressure to said first chamber to act on said piston assembly;

a discharge passage in said housing for conducting primary fluid from said second and third chambers from said apparatus;

additive fluid cylinder means and additive fluid piston means reciprocably disposed in said additive fluid cylinder means and dividing said additive fluid cylinder means into first and second additive fluid chambers, said additive fluid cylinder means including valve means for admitting additive fluid to said first additive fluid chamber, said additive fluid piston means being slidably disposed on said piston rod means and including passage means interconnecting said additive fluid chambers in at least one position of said additive fluid piston means, said piston rod means including means for reciprocating said additive fluid piston means through an additive fluid intake and delivery stroke of said additive fluid piston means, respectively, to effect displacement of predetermined charge of additive fluid into said primary fluid during a reciprocating stroke cycle of said piston assembly;

spaced apart stop means on said piston rod means engageable with said additive fluid piston means, one of said stop means including seal means engageable with said additive fluid piston means during a delivery stroke of said additive fluid piston means to close said passage means in said additive fluid piston means from interconnecting said additive fluid chambers, and spacer means removably mounted on said piston rod means between said additive fluid piston means and one of said stop means for selectively varying the displacement of said additive fluid piston means to vary the charge of additive fluid injected into said primary fluid during a delivery stroke of said additive fluid piston means;

valve means associated with said piston assembly and movable to respective positions to place said first and second chambers in communication with each other and close off communication between said second and third chambers and alternately close off said first chamber from said second chamber while communicating said second chamber with said third chamber;

means for yieldably biasing said valve means in said positions, respectively; and means forming an additive fluid injection passage in communication with said additive fluid cylinder means and said discharge passage for injecting additive fluid into said primary fluid downstream of said first chamber in the direction of flow of primary fluid through said apparatus.

14. The apparatus set forth in claim 13 wherein:
said additive fluid piston means includes seal means mounted thereon and engageable with the bore wall of said additive fluid cylinder means to prevent displacement of said additive fluid piston means in said additive fluid cylinder means except when said additive fluid piston means is engaged by one of said stop means.

15. Apparatus for injecting a predetermined quantity of fluid additive into a primary fluid stream comprising:
a housing defining first and second cylinder bores, a differential piston assembly reciprocably disposed in said bores and forming first, second and third fluid chambers in said housing;
an inlet passage in said housing for conducting primary fluid under pressure to said first chamber to act on said piston assembly;
a discharge passage in said housing for conducting primary fluid from said second and third chambers from said apparatus;
valve means movable in response to movement of said piston assembly to place said first and second chambers in communication with each other and close off communication between said second and third chambers and alternately close off said first chamber from said second chamber while communicating said second chamber with said third chamber;
additive fluid cylinder means and additive fluid piston means reciprocably disposed in said additive fluid cylinder means and dividing said additive fluid cylinder means into first and second additive fluid chambers and for displacing a quantity of additive fluid from said additive fluid cylinder means for injection into said primary fluid;
valve means for admitting additive fluid to said first additive fluid chamber;
a piston rod interconnecting said piston assembly with said additive fluid piston means for reciprocation with said piston assembly, said additive fluid piston means being slidably mounted on said piston rod and including passage means interconnecting said additive fluid chambers in at least one position of said additive fluid piston means, spaced apart stop means formed on said piston rod for reciprocating said additive fluid piston means through an additive fluid intake and delivery stroke of said additive fluid piston means, respectively, to effect displacement of a predetermined quantity of additive fluid into said primary fluid during a reciprocating stroke cycle of said piston assembly; and
spacer means removably mountable on said piston rod between said additive fluid piston means and one of said stop means for selectively varying the displacement of said additive fluid piston means to vary the charge of additive fluid injected into said primary fluid during a delivery stroke of said additive fluid piston means.

16. The apparatus set forth in claim 15 wherein:
said additive fluid piston means includes seal means mounted thereon and engageable with the bore wall of said additive fluid cylinder means to prevent displacement of said additive fluid piston means in said additive fluid cylinder means except when said additive fluid piston means is engaged by one of said stop means.

17. Apparatus for injecting a predetermined quantity of fluid additive into a primary fluid stream comprising:
a housing defining first and second cylinder bores of different diameters, a differential piston assembly reciprocably disposed in said bores and forming first, second and third fluid chambers in said housing;
an inlet passage in said housing for conducting primary fluid under pressure to said first chamber to act on said piston assembly;
a discharge passage in said housing for conducting primary fluid from said second and third chambers from said apparatus;
additive fluid cylinder means and additive fluid piston means reciprocably disposed in said additive fluid cylinder means for displacing a quantity of additive fluid from said additive fluid cylinder means for injection into said primary fluid;
piston rod means interconnecting said piston assembly with said additive fluid piston for reciprocation with said piston assembly;
first and second valves associated with said piston assembly and movable to a first position to place said first and second chambers in communication with each other and close off communication between said second and third chambers and to a second position to close off said first chamber from said second chamber while communicating said second chamber with said third chamber; and
means for moving said valves between said positions and yieldably biasing said valves in said positions, respectively, including a shaft coaxial with said piston rod means and disposed on said piston assembly for reciprocation relative to said piston assembly to move said valve means between said positions, and toggle means for urging said shaft into respective ones of said positions in response to movement of said shaft, said toggle means including link means interconnecting said shaft with said piston assembly and spring means associated with said link means for biasing said shaft in a selected one of opposite directions in response to said link means moving through an unstable position between opposed stable positions corresponding to said first and second positions of said valve means, said toggle means including means forming a lost motion coupling between said shaft and said link means for imparting an impact force to said shaft when said link means moves toward a stable position to move said valve means toward one of said positions, respectively, and said shaft including means engageable with said housing to initiate movement of said shaft in opposite directions in response to movement of said shaft with said piston assembly toward opposed limit positions of said piston assembly.

18. Apparatus for injecting a predetermined quantity of fluid additive into a primary fluid stream comprising:
   a housing defining first and second cylinder bores of different diameters, a differential motor piston reciprocably disposed in said bores and forming first, second and third fluid chambers in said housing;
   an inlet passage in said housing for conducting primary fluid under pressure to said first chamber to act on said motor piston;
   a discharge passage in said housing for conducting primary fluid from said second and third chambers from said apparatus;
   additive fluid cylinder means and additive fluid piston means reciprocably disposed in said additive fluid cylinder means for displacing a quantity of additive fluid from said additive fluid cylinder means for injection into said primary fluid;
   piston rod means interconnecting said motor piston with said additive fluid piston for reciprocation with said motor piston;
   a shaft disposed on and coaxial with said motor piston, an over center mechanism connected to said shaft for biasing said shaft in two limit positions relative to said motor piston, a first valve closure member cooperable with said motor piston for movement between open and closed positions for controlling fluid flow between said first and second chambers, said first closure member being disposed on and slidable relative to said shaft and movable by said shaft between said open and closed positions, second valve closure means connected to said first closure member for movement with said first closure member and cooperable with said motor piston to provide for fluid flow between said second and third chambers when said first closure member has closed off fluid flow between said first and second chambers and closing off fluid flow between said second and third chambers when said first closure member opens to provide for fluid flow between said first and second chambers.

19. Apparatus for injecting a predetermined quantity of fluid additive into a primary fluid stream comprising:
   a housing defining first and second cylinder bores, a differential piston assembly reciprocably disposed in said bores and forming first, second and third fluid chambers in said housing;
   an inlet passage in said housing for conducting primary fluid under pressure to said first chamber to act on said piston assembly;
   a discharge passage in said housing for conducting primary fluid from said second and third chambers from said apparatus;
   valve means operable to place said first and second chambers in communication with each other and close off communication between said second and third chambers and alternately close off said first chamber from said second chamber while communicating said second chamber with said third chamber;
   additive fluid cylinder means and additive fluid piston means reciprocably disposed in said additive fluid cylinder means and dividing said additive fluid cylinder means into first and second additive fluid chambers and for displacing a quantity of additive fluid from said additive fluid cylinder means for injection into said primary fluid;
   means for admitting additive fluid to said first additive fluid chamber;
   a piston rod interconnecting said piston assembly with said additive fluid piston means for reciprocation with said piston assembly, said additive fluid piston means being slidably mounted on said piston rod, spaced apart stop means on said piston rod for reciprocating said additive fluid piston means through an additive fluid intake stroke and an additive fluid delivery stroke of said additive fluid piston means, respectively, to effect displacement of a predetermined quantity of additive fluid into said primary fluid during a reciprocating stroke cycle of said piston assembly; and
   means associated with at least one of said stop means for selectively varying the displacement of said additive fluid piston means to vary the charge of additive fluid injected into said primary fluid during a delivery stroke of said additive fluid piston means.

* * * * *